July 20, 1965  R. A. CONNELL ETAL  3,196,412
QUANTIZED FLUX CRYOGENIC DEVICE
Filed Oct. 5, 1962  2 Sheets-Sheet 1
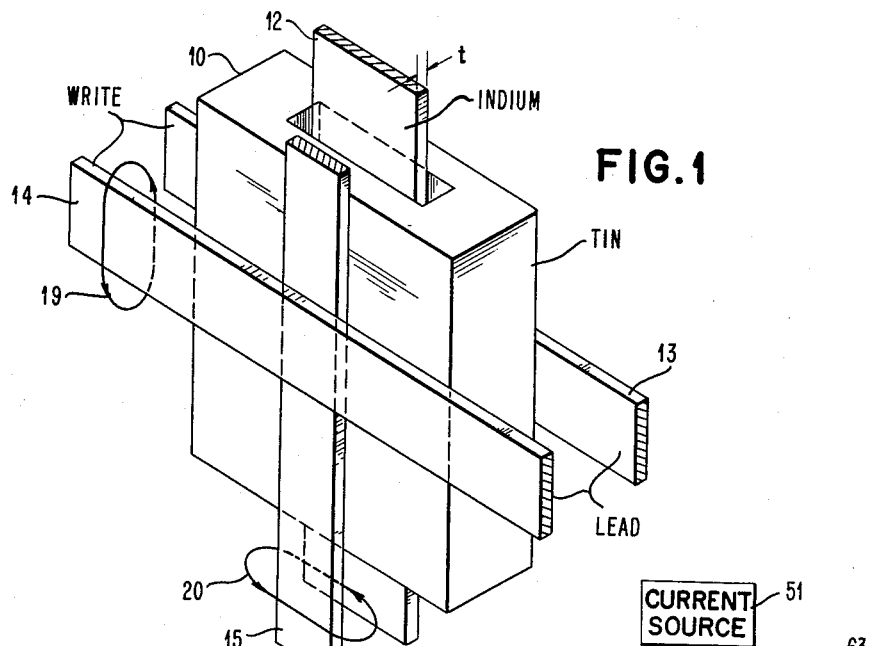
FIG. 1
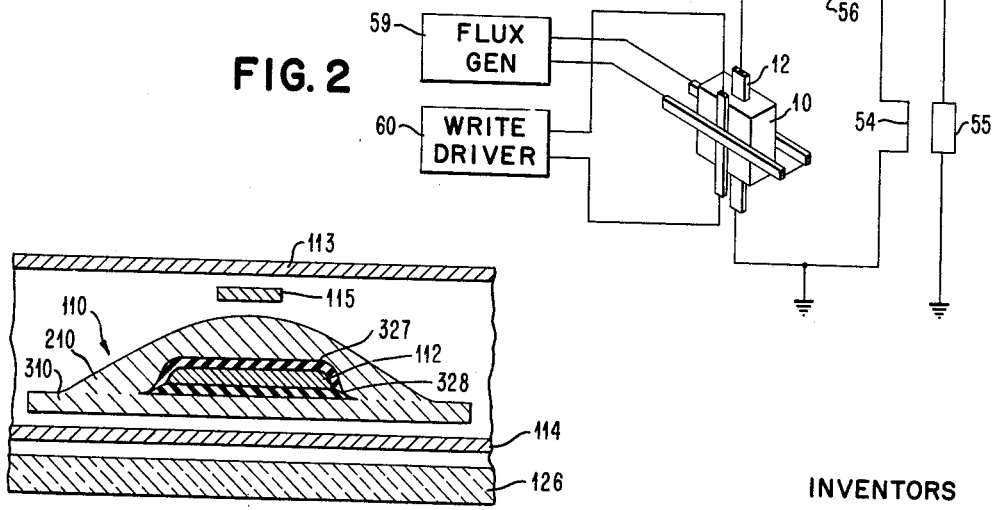
FIG. 2
FIG. 4
INVENTORS
RICHARD A. CONNELL
LAWRENCE P. HORWITZ
DANIEL J. QUINN
DONALD P. SERAPHIM
BY *Elmer W. Galbraith*
ATTORNEY July 20, 1965  R. A. CONNELL ETAL  3,196,412
QUANTIZED FLUX CRYOGENIC DEVICE
Filed Oct. 5, 1962  2 Sheets-Sheet 2

FLUX QUANTA STORED
CURRENT IN CONDUCTORS 13 AND 14

United States Patent Office 3,196,412
Patented July 20, 1965

3,196,412
QUANTIZED FLUX CRYOGENIC DEVICE
Richard A. Connell, Mount Kisco, Lawrence P. Horwitz and Daniel J. Quinn, Chappaqua, and Donald P. Seraphim, Bedford Hills, N.Y., assignors to International Business Machines Corporation, New York, N.Y., a corporation of New York
Filed Oct. 5, 1962, Ser. No. 228,584
15 Claims. (Cl. 340—173.1)

This invention relates to electrical circuitry and more particularly to superconductive circuitry.

It is well known that (a) electric charge is "quantized" by the electrons which form the charge, (b) that the electrons in atoms have certain "quantized" energy levels at which they can exist, (c) that the light spectrum is quantized, (d) that the angular momentum of electrons is "quantized," etc. Similarly, it is known that the flux threading through a closed loop of superconductive material can only exist at certain "quantized" levels. These quantized levels are not merely different from each other, but they differ from each other by certain definite calculable amounts. A possible theoretical explanation of this phenomenon is discussed in the references hereinafter cited.

An analysis of Schrodinger's wave equation shows the particular flux levels which can exist inside a closed loop of superconductive material. Flux levels other than the permitted or "quantized" flux levels are prohibited nonstable states and forces (reaction currents) are generated in order to prevent the prohibited flux levels from existing. In the device of the present invention a certain amount of flux (a certain number of quanta of flux) are stored in a closed loop of superconductive material. These flux quanta are then used as a precise bias field whereby the number of quanta stored can be determined.

The prior art shows many devices which store flux in a closed loop of superconductive material; however, in such devices the differences between the various "quantized levels" are totally insignificant compared to the levels of flux which are stored. Hence, in the devices shown in the prior art it appears that any level of flux can exist. The difference between the device of the present invention and the devices shown in the prior art which store flux in a closed loop of superconductive material is similar to the difference between a device which operates based upon storing different values of electric charge and a device which operates based upon storing a discrete number of electrons. A much more sophisticated structure is needed to actually differentiate between the different numbers of electrons (a microscopic phenomena) than is needed to differentiate between different amounts of electric charge (a macroscopic phenomena). As previously explained, similar to the manner that electric charge is quantized by "electrons," the flux stored in a closed superconductive loop is quantized. The device of the present invention uses these different quantized levers of flux to store information.

Copending application Serial No. 213,279 filed July 30, 1962 entitled, "A Quantized Flux Cryogenic Device," by Lawrence P. Horwitz, which is assigned to the assignee of the present invention, shows a device which uses the different "quantized flux" levels to store information. The difference between the device shown in the present application and the device shown in the above referenced application relates to the manner in which the information is read from the device. The device shown in the above referenced application destroys the information stored during a read operation whereas in the device of the present invention a read operation does not destroy the information stored. Stated differently, the device shown in the above referenced copending application has a destructive read operation whereas the device of the present invention has a nondestructive read operation.

An object of the present invention is to provide an improved information storage device.

Another object of the present invention is to provide a small relatively inexpensive information storage device.

Still another object of the present invention is to provide means for determining the number of flux quanta stored in the cylinder without allowing any of the flux quanta to escape from the cylinder.

Yet another object of the present invention is to provide an effective means for determining the number of flux quanta stored in a thin walled cylinder.

A still further object of the present invention is to provide an improved threshold device.

The foregoing and other features, objects and advantages of the present invention will be apparent from the following more particular description of preferred embodiments of the invention as illustrated in the accompanying drawings.

FIGURE 1 is a perspective view of a first preferred embodiment of the storage element of the present invention.

FIGURE 2 is a circuit diagram showing the circuit used to operate the storage element.

FIGURE 4 is a cross sectional view of a second embodiment of the storage element of the present invention.

Figure 3A:
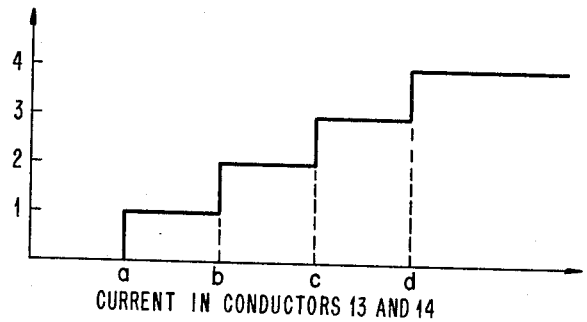
FIGURES 3A to 3C are graphs showing current and voltage conditions in the circuit.

FIGURE 1 shows a cylinder 10. A core 12 is positioned inside of cylinder 10. Core 12 is electrically insulated from cylinder 10; however, in the interest of clarity, the insulation is not shown in the drawing. Three conductors 13, 14 and 15 are positioned outside of cylinder 10. Conductors 13 and 14 run perpendicular to the axis of cylinder 10 and conductor 15 runs parallel to the axis of cylinder 10. Conductors 13, 14 and 15 are insulated from each other and from cylinder 10; however, in the interest of clarity of illustration the insulating material is not shown on the drawing.

Cylinder 10 is made of tin, core 12 is made of indium and conductors 13, 14 and 15 are made of lead. It is noted that lead has a higher critical field than tin or indium and that tin has a higher critical field than indium. The entire device is maintained at a temperature of about three degrees Kelvin so that in the absence of a magnetic field the indium, tin and lead components are superconducting.

As explained in detail in the previously referenced copending application and in the references cited therein, when cylinder 10 is superconducting only certain discrete quantized levels of flux can exist therein. One quantum of flux equals $2 \times 10^{-7}$ gauss-centimeters$^2$, i.e., a quantum of flux has the physical dimensions of the product (magnetic field) $\times$ (area). Therefore, both the magnitude of the applied magnetic field which stores the flux in the cylinder and the flux storage area of the cylinder determine the number of quanta which are stored in the cylinder. The amount of flux inside of cylinder 10 while it is superconducting must always be an integral number of quanta, that is, the amount of flux inside cylinder 10 must always be an integral multiple of $2 \times 10^{-7}$ gauss-centimeters$^2$. The different flux levels are used herein to indicate different values of information.

Flux is stored in cylinder 10 by current in conductors 13, 14 and 15. Current flowing in opposite directions in conductors 13 and 14 generates a magnetic field which has a component along the axis of cylinder 10 and current in conductor 15 generates a magnetic field which is perpendicular to the axis of cylinder 10. The direction of the magnetic field generated by current flowing in opposite directions in conductors 13 and 14 is generally indicated by the arrow designated 19 and the direction of the magnetic field generated by current in conductor 15 is generally indicated by the arrow designated 20. Current in conductor 15 is used to change cylinder 10 from the superconductive state to the resistive state. Since the magnetic field generated by current in conductor 15 is perpendicular to the axis of cylinder 10 none of the flux generated by current in conductor 15 can be stored inside of cylinder 10. Flux is stored in cylinder 10 in the following manner: The cylinder 10 is made resistive by current in conductor 15 and while the cylinder is resistive a certain amount of flux along the axis of the cylinder is generated by current in conductors 13 and 14. While the flux generated by current in conductors 13 and 14 is inside of the cylinder, the current in conductor 15 is terminated, thereby allowing cylinder 10 to become superconducting and trapping some of the flux inside of the cylinder. For clarity of illustration conductors 13 and 14 are shown relatively narrow; however, in order to efficiently generate a field inside of cylinder 10 they should be as wide as cylinder 10 is long.

Due to the phenomena described in the previously referenced copending application the flux trapped in cylinder 10 is dependent upon the amount of current applied to lines 13 and 14; however, the amount of flux will always be an integral number of quanta, that is, the amount of flux will always be an integral multiple of $2 \times 10^{-7}$ gauss-centimeters$^2$. The number of quanta stored is dependent upon the amount of current in conductors 13 and 14; however, for a reltaively wide range of current, the same number of flux quanta will be stored. Hence, the current in conductor 13 and conductor 14 need not be exactly controlled. The fact that the same number of flux quanta are stored for various amounts of current in conductors 13 and 14 is shown by the graph of FIGURE 3A which shows the number of flux quanta stored in relation to the amount of current in conductors 13 and 14. For example, if the current in conductors 13 and 14 is anywhere in the range between the points designated "c" and "d" three quanta of flux are stored.

The number of quanta of flux stored in cylinder 10 can be used to indicate different values of a variable. For example, if the variable has three different possible values, these values can be respectively indicated by one, two and three quanta of flux in cylinder 10. The state of the variable can be stored by applying the appropriate amount of current to lines 13 and 14 during a storage operation. For example, in order to store the second state of the variable, current having a value between points "b" and "c" in FIGURE 3A would be applied to to lines 13 and 14.

The critical current of core 12 (that is, the amount of current which must be passed through core 12 in order to make core 12 resistive) is dependent upon the amount of magnetic flux inside of cylinder 10. This fact is used to read information from cylinder 10.

The circuitry used to read information from the element is shown in FIGURE 2. The circuit has a current source 51 connected to ground through two current paths 52 and 53. Core 12 is connected in series with current path. Current path 53 has an inductance 56 and cryotron control element 54 connected in series therewith. Cryotron control element 54 has an associated gating element 55 and the magnetic field generated by current in control element 54 can change gating element 55 from the superconductive state to the resistive state.

Figure 3B:
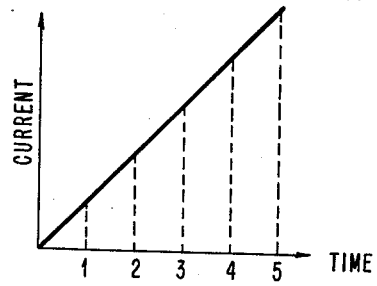

The value of the information stored in cylinder 10 (i.e., the number of flux quanta stored therein) is determined as follows. Current source 51 generates a ramp function output as indicated in FIGURE 3B. Initially both current paths 52 and 53 are superconductive and the current from current source 51 therefore divides between current path 52 and 53 in proportion to the inductance of the paths. Since the inductance of current path 52 is less than the inductance of current path 53, initially the current increases more quickly in current path 52 than in current path 53. The current in current path 52 finally reaches a value which equals the critical current of core 12. The current in path 52 cannot exceed the critical current of core 12 since if it does core 12 becomes resistive thereby shifting current from current path 52 to current path 53. Hence, once the current in path 52 reaches the critical current of core 12 it thereafter remains substantially stable at this value. After the current in current path 52 reaches the critical current of core 12 the current in current path 53 increases at a faster value than previously.

The amount of time required for the current in control conductor 54 to read the value which is sufficient to change gating element 55 from the superconductive state to the resistive state is dependent upon the number of flux quanta initially stored in cylinder 10. The larger the number of flux quanta initially stored in cylinder 10 the sooner the current in conductor 54 reaches a value which is sufficient to change gating element 55 from the superconductive state to the resistive state.

Figure 3C:
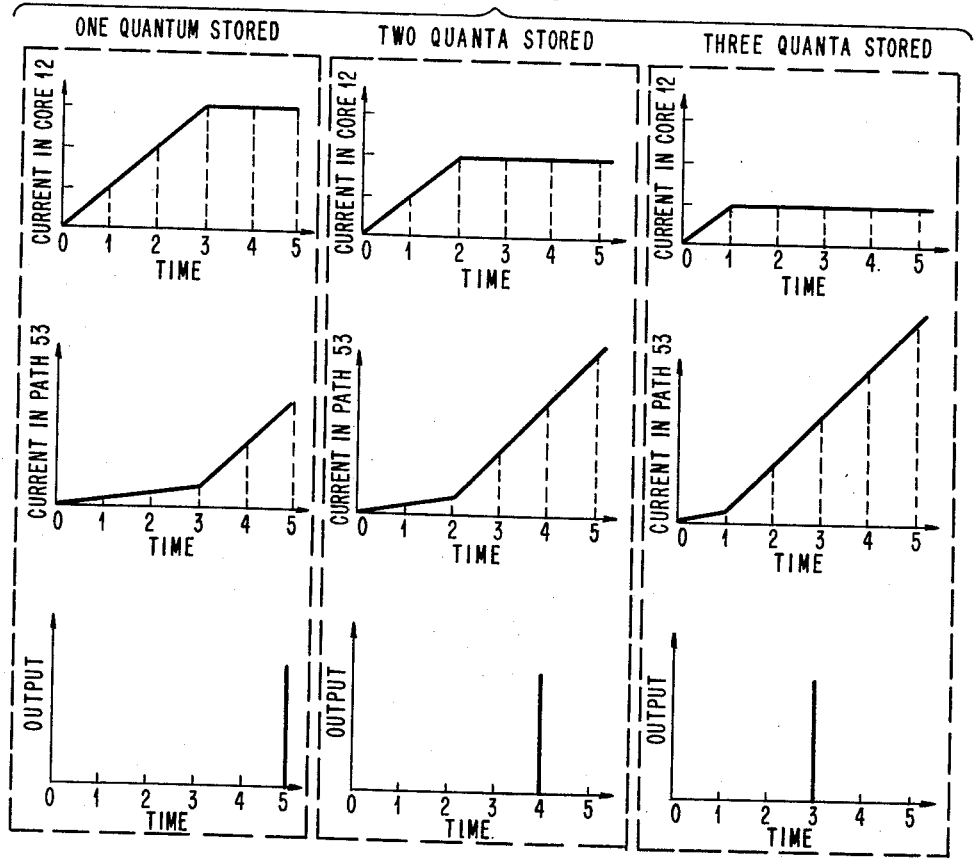

FIGURE 3C shows the conditions in the circuit when current source 51 applies a current such as that shown in FIGURE 3A. The three graphs in the top row of FIGURE 3C show the value of the current in current path 52 with respect to time when there are respectively one, two and three quanta of flux stored in cylinder 10. Likewise, the three graphs in the second row of FIGURE 3C respectively show the value of current in current path 53 with respect to time when there are one, two or three quanta of flux stored in cylinder 10. The three graphs in the third row of FIGURE 3C respectively show the amount of time required for gating element 55 to become resistive where there are one, two or three quanta of flux stored in cylinder 10. The strobe 63 which is connected to cryotron 55 periodically senses the state of cryotron 55 by generating pulses at its output and detecting when there is a superconducting path to ground.

The description of the operation of the device given herein relates to adiabatic operation and thus the description is an idealism of the case where the storage device is operated at slow speed. If the device is operated at a high speed the various curves shown in FIGURE 3C would naturally be slightly modified due to temperature changes; however, the principle of operation is not changed.

It is further noted that the description given with reference to FIGURE 3C does not explicitly take into account the time required for core 12 to change from the superconductive state to the resistive state. Due to the time required for core 12 to switch from the superconductive state to the resistive state the current in core 12 does not remain exactly constant after the core becomes resistive. Instead the current in core 12 decreases slightly and if the core 12 has a very long time constant the current in core 12 can be substantially reduced after the core becomes resistive and before the core can again become superconductive. If the time constant of core 12 is long compared to the time constant of the readout circuit shown in FIGURE 2, the current in core 12 will drop to zero after the core becomes resistive. The description previously given relates to the situation where the time periods designated 1 to 5 are very long compared to the time constant of core 12.

One quantum of flux, that is, $2 \times 10^{-7}$ gauss-centimeters$^2$ of flux, is a relatively small amount of flux. If a small number of quanta of flux are stored in a cylinder which has a relatively large cross-sectional area which the flux can occupy, the flux density is very small (i.e., the field intensity is very small). In order to get a substantial flux density from a small number of flux quanta the flux must be confined in a very small cross-sectional area. Hence, the cross-sectional area of the volume inside cylinder 10 is made as small as possible.

When core 12 is resistive the magnetic flux inside of cylinder 10 occupies all of the volume inside of cylinder 10 including the volume occupied by core 12; however, when core 12 is superconductive the magnetic flux inside of cylinder 10 can be considered as penetrating into each face of core 12 to a depth generally termed the penetration depth. If the thickness "T" of core 12 is much greater than twice the penetration depth, the volume occupied by the flux inside of cylinder 10 changes appreciably when core 12 changes from a superconducting state to a resistive state. In order to prevent any substantial change in the field intensity inside of cylinder 10 when core 12 changes from the superconductive state to the resistive state the thickness of core 12 should be less than the penetration depth of the core.

If the thickness of core 12 is much greater than the penetration depth, when core 12 is superconductive the magnetic field inside of cylinder 10 is excluded from the center portion of core 12. In this case when the current in core 12 reaches a magnitude so that the magnetic field at the surface of core 12 exceeds its critical field and at least a portion of core 12 switches to the resistive state, the flux inside of cylinder 10 thereafter occupies a portion of the core from which it was previously excluded. This reduces the magnetic field intensity at the surface of the portion of the core which is superconductive to below the critical field and hence the core arrives at an intermediate state wherein part of the core is superconductive and part of the core is resistive. The core can remain in this intermediate state until there is a substantial increase in the current through the core.

Two characteristics of a superconductive material are its coherence length and its interface surface energy. If the material from which core 12 is fabricated has a positive interface surface energy and if the dimensions of core 12 are less than the coherence length of the material, an oscillatory mode of operation can be established since the positive interface surface energy can prevent the establishment of an intermediate state. Hence, in this case when the current in core 12 reaches the point where the flux inside of cylinder 10 exceeds the critical magnetic field the entire core switches from the superconductive state to the resistive state thereby reducing the field intensity to below the critical magnetic field. The core then switches back to the superconductive state and the cycle repeats. During the time that core 12 is resistive some of the current is shifted from path 52 to path 53. Hence, when core 12 again becomes superconductive the current therein will be below the critical current. The time for the current to again reach the critical current (i.e., the frequency of oscillation) is dependent upon the electrical and the thermal time constants of the circuit and upon the rate of increase of the input current.

The output circuit naturally could be more complex than that shown in FIGURE 2. For example, it would include various logical networks. There could be a plurality of output cryotrons each biased differently. The control line for each of these output cryotrons would be connected in series with current path 53. Each of the gating elements of the cryotrons could be interrogated simultaneously, for example, at the time designated T5 in FIGURE 3. Since the amount of current in current path 53 is representative of the number of flux quanta stored in cylinder 10 and since each cryotron gate is biased differently, the various biases applied to the cryotron could be arranged so that at timed period T4, if one flux quantum were stored in cylinder 10, one of the gates would be resistive, if two flux quanta were stored in cylinder 10, two of the gates would be resistive, etc.

A second embodiment of the invention is shown in FIGURE 4. This embodiment shows how the invention can conveniently be fabricated in thin film form by conventional vapor deposition techniques. The second embodiment includes a cylinder 110 which is made of two connected layers designated 210 and 310, a core 112, three conductors 113, 114 and 115 and a substrate 126.

The core 112 is insulated from layer 210 by a thin layer of insulating material 327 and from layer 310 by a thin layer of insulating material 328. Conductor 114 is insulated from substrate 126, cylinder 110 is insulated from conductor 114, conductor 115 is insulated from cylinder 110, and conductor 113 is insulated from conductor 115. For clarity of illustration the insulation except the insulation between core 112 and layers 210 and 310 is shown by an absence of crosshatching.

Similar to the first embodiment, core 112 is made of indium, cylinder 110 is made of tin and conductors 113, 114 and 115 are made of lead. Substrate 126 is made of glass. Cylinder 110 performs the same function as cylinder 10, core 112 performs the same function as core 12 and conductors 113, 114 and 115 respectively perform the same function as conductors 13, 14 and 15. The device can be connected in a circuit such as that shown in FIGURE 2 and since the operation is the same as for the first embodiment it will not be described again.

As previously explained it is desirable to have the cross sectional area of the cylinder as small as possible; however, the core must be electrically insulated from the cylinder. In the structure shown in FIGURE 4, core 112 is 2,000 angstroms thick, insulating layer 327 and 328 are each 150 angstroms thick and layers 210 and 310 which form cylinder 110 are each 10,000 angstroms thick. For clarity of illustration the thickness of the various layers is not shown in the correct proportion in FIGURE 4.

The structure shown in FIGURE 4 is fabricated as follows: (a) first, a layer of insulating material is deposited on substrate 126, (b) next, a strip of lead is deposited in order to form conductor 114, (c) next, conductor 114 is covered with a layer of insulating material, (d) next, a layer of tin is deposited to form layer 310, (e) next, a layer of insulating material is deposited to form layer 328, (f) next, a layer of indium is deposited to form a core 112, (g) next, core 112 is covered by a layer of insulating material to form layer 327, (h) next, a layer of indium is deposited to form layer 310 and thereby complete cylinder 110, (i) next, cylinder 110 is covered with a layer of insulating material, (j) next, a strip of lead is deposited to form conductor 115, (k) next, conductor 115 is covered with a layer of insulating material, (l) and finally, a strip of lead is deposited to form conductor 113.

In order to make the volume of cylinder 110 as small as possible and in order to obtain reliable insulation without undue thickness, layers 327 and 328 are fabricated from an organic polymer composition. Furthermore, they are deposited by techniques whereby the definition of these components can be controlled through the use of an electron beam or ultra violet light. The method and apparatus for this technique of fabrication is explained in copending application Serial No. 205,821 filed June 19, 1962, by Peter White entitled, "Circuit Fabrication," which is assigned to the assignee of the present invention.

The various other components can be fabricated by the techniques described in the above-referenced application or they can be deposited by other known techniques such as those described in copending application Serial No. 135,920, filed September 5, 1961, by J. Priest, entitled "Method of Depositing Silicon Monoxide Films," which is assigned to the assignee of the present invention.

Herein only one information storage device is shown in the circuit of FIGURE 2. However, it should be understood that a plurality of these devices could be connected in a matrix and addressed by multidimensional schemes. Furthermore, in the particular embodiment described herein the device is fabricated from lead, tin and indium. These three materials are shown merely for the purpose of illustration and it should be understood that any three materials having different critical temperatures could be used.

While the invention has been particularly shown and described with reference to preferred embodiments thereof, it will be understood by those skilled in the art that the foregoing and other changes in form and details may be made therein without departing from the spirit and scope of the invention.

What is claimed is:
1. An information storage device comprising,
   a cylinder made of material having a superconductive state and a resistive state,
   means for storing a selected number of quanta of flux in said cylinder, a core positioned inside said cylinder, said core having a superconductive state and a resistive state,
   means for electrically insulating said core from said cylinder for obtaining a critical current of said core which is dependent upon the number of flux quanta stored in said cylinder,
   means for passing current through said core to determine the amount of current required to make said core resistive,
   a current source for generating an increasing current output, and
   first and second current paths connected to said current source for obtaining nondestructive read of said number of flux quanta, said first current path including said core, said second current path having a higher inductance than said first current path,
   whereby the current in said first current path increases rapidly and the current in said second current path increases slowly until the current in said first path reaches the critical current of said core and thereafter the current in said first path remains substantially constant and the current in said second current path increases rapidly.
2. The device recited in claim 1 wherein the thickness of said core is less than the penetration depth of said core.
3. The device recited in claim 1 wherein said core substantially fills the volume of said cylinder.
4. The device recited in claim 1 wherein said second current path includes cryotron control element.
5. The device recited in claim 1 wherein said cylinder is made of tin and said core is made of indium.
6. The device recited in claim 1 wherein said means for storing a selected number of quanta of flux includes means for changing said cylinder from the superconductive state to the resistive state and means for generating flux parallel to the axis of said cylinder.
7. The device recited in claim 6 wherein said means for changing said cylinder from the superconductive state to the resistive state includes means for generating magnetic flux perpendicular to the axis of said cylinder.
8. An information storage device comprising,
   a cylinder made of material having a superconductive state and a resistive state, said cylinder having a certain volume,
   means for storing a selected number of quanta of flux in said cylinder,
   a core positioned inside of said cylinder, said core having a superconductive state and a resistive state,
   means for electrically insulating said core from said cylinder for obtaining a critical current of said core which is dependent upon the number of flux quanta stored in said cylinder, and
   means for passing current through said core for determining the amount of current required to make said core resistive and for determining nondestructively the number of flux quanta stored in said cylinder.
9. The device recited in claim 8 wherein the thickness of said core is less than the penetration depth of said core.
10. An information storage device comprising,
    a cylinder made of material having a superconductive state and a resistive state, said cylinder having a certain volume,
    first means for changing said cylinder from a superconductive state to a resistive state, said means generating no flux along the axis of said cylinder,
    second means for generating flux along the axis of said cylinder for storing a selected number of flux quanta generated by said second means in said cylinder,
    a core substantially filling the volume of said cylinder, said core having a superconductive state and a resistive state,
    means for electrically insulating said core from said cylinder for obtaining a critical current of said core which is dependent upon the number of flux quanta stored in said cylinder, and
    means for passing current through said core for determining the amount of current required to make said core resistive and for determining nondestructively the number of flux quanta stored in said cylinder,
11. The device recited in claim 10 wherein said means for changing said cylinder from a superconductive state to a resistive state includes means for generating magnetic flux in a direction perpendicular to the axis of said cylinder.
12. The device recited in claim 9 wherein said cylinder is made of tin and said core is made of indium.
13. The device recited in claim 10 wherein said cylinder is made of tin and said core is made of indium.
14. The device recited in claim 8 wherein said cylinder is made of tin and said core is made of indium.
15. A threshold device comprising,
    a cylinder made of material having a superconductive state and a resistive state, said cylinder having a certain volume,
    means for storing a selected number of quanta of flux in said cylinder,
    a core positioned inside of said cylinder, said core having a superconductive state and a resistive state, said core having a thickness less than the penetration depth of said core,
    means for electrically insulating said core from said cylinder for obtaining a critical current of said core which is dependent upon the number of flux quanta stored in said cylinder, and
    means for passing current through said core for determining the amount of current required to make said core resistive.

References Cited by the Examiner
UNITED STATES PATENTS

| | | | |
|---|---|---|---|
| 2,944,211 | 7/60 | Richards | 307—88.5 |
| 3,007,057 | 10/61 | Brennemann | 307—88.5 |
| 3,016,507 | 1/62 | Grant et al. | 338—32 |
| 3,048,707 | 8/62 | Nyberg | 340—173.1 |

References Cited by the Applicant
UNITED STATES PATENTS

| | | |
|---|---|---|
| 2,949,602 | 8/60 | Crowe. |

IRVING L. SRAGOW, *Primary Examiner.*